US010590292B2

(12) United States Patent
Leprince

(10) Patent No.: US 10,590,292 B2
(45) Date of Patent: Mar. 17, 2020

(54) ENVIRONMENTALLY FRIENDLY INK AND FOUNTAIN SOLUTION FOR WET OFFSET PRINTING PROCESS AND WET OFFSET PRINTING PROCESS

(71) Applicant: SICPA HOLDING SA, Prilly (CH)

(72) Inventor: Cecile Leprince, Yverdon-les-Bains (CH)

(73) Assignee: SICPA HOLDING SA, Prilly (CH)

( * ) Notice: Subject to any disclaimer, the term of this patent is extended or adjusted under 35 U.S.C. 154(b) by 386 days.

(21) Appl. No.: 15/568,185

(22) PCT Filed: Jul. 1, 2016

(86) PCT No.: PCT/EP2016/065519
§ 371 (c)(1),
(2) Date: Oct. 20, 2017

(87) PCT Pub. No.: WO2017/001666
PCT Pub. Date: Jan. 5, 2017

(65) Prior Publication Data
US 2019/0106582 A1    Apr. 11, 2019

(30) Foreign Application Priority Data

Jul. 1, 2015  (EP) .................................. 15174767

(51) Int. Cl.
| | | |
|---|---|---|
| *C09D 10/00* | (2006.01) | |
| *C09D 11/03* | (2014.01) | |
| *B41M 3/14* | (2006.01) | |
| *B41M 1/06* | (2006.01) | |
| *B41N 3/08* | (2006.01) | |
| *C09D 11/033* | (2014.01) | |
| *B42D 25/378* | (2014.01) | |
| *C08K 5/13* | (2006.01) | |
| *C08K 5/3467* | (2006.01) | |
| *C09K 3/00* | (2006.01) | |
| *C09D 1/00* | (2006.01) | |
| *C09D 4/00* | (2006.01) | |
| *C09D 5/00* | (2006.01) | |
| *C09D 11/00* | (2014.01) | |
| *C09D 13/00* | (2006.01) | |
| *C08K 3/22* | (2006.01) | |

(52) U.S. Cl.
CPC .............. *C09D 11/03* (2013.01); *B41M 1/06* (2013.01); *B41M 3/14* (2013.01); *B41N 3/08* (2013.01); *B42D 25/378* (2014.10); *C08K 5/13* (2013.01); *C08K 5/3467* (2013.01); *C09D 11/033* (2013.01); *B41P 2200/22* (2013.01); *C08K 2003/2262* (2013.01)

(58) Field of Classification Search
USPC .......................................... 106/31.01, 31.13
See application file for complete search history.

(56) References Cited

U.S. PATENT DOCUMENTS

| | | |
|---|---|---|
| 3,168,037 A | 2/1965 | Dahlgren |
| 3,354,824 A | 11/1967 | Griffith et al. |
| 3,625,715 A | 12/1971 | Nasca |
| 4,604,952 A | 8/1986 | Daugherty |
| 4,798,627 A | 1/1989 | Schmitt et al. |
| 5,074,914 A | 12/1991 | Shirota et al. |
| 5,997,622 A | 12/1999 | Weber et al. |
| 6,001,161 A | 12/1999 | Evans et al. |
| 6,436,176 B1 | 8/2002 | Van Hunsel et al. |
| 2004/0211333 A1 | 10/2004 | Sugerman |
| 2013/0274386 A1* | 10/2013 | Weijnen .................... C09F 9/00 524/92 |
| 2014/0342163 A1* | 11/2014 | Meijer ................. C08K 5/0091 428/423.1 |
| 2016/0304747 A1* | 10/2016 | Ang ...................... C09D 167/08 |

FOREIGN PATENT DOCUMENTS

| | | |
|---|---|---|
| EP | 0285359 | 10/1988 |
| EP | 1564271 | 4/2007 |
| EP | 2098377 | 9/2009 |
| EP | 2548929 | 1/2013 |
| JP | 62-190272 | 8/1987 |

(Continued)

OTHER PUBLICATIONS

Romakh et al., "Dinuclear Manganese Complexes Containing Chiral 1, 4, 7-Triazacyclononane-Derived Ligands and Their Catalytic Potential for the Oxidation of Olefins, Alkanes, and Alcohols", Inorg. Chem 2007, 1315-1331, e.g. scheme 3 on p. 1317.
Plastics Additives Handbook (H. Zweifel, 5th Ed. 2001, Hanser Publishers Munich, ISB 3-446-21654-5), 30 pages.
CEPE Guideline on Safety Data Sheets for the Paint, Varnish, Printing Ink and Artists' Colours Industry, Dec. 2010, 58 pages.
Bouwman et al., "A study of new manganese complexes as potential driers for alkyd paints", J. Coat Technol Res 4(4) (2007, 491-503).
Zhang et al., "Synthesis and Characterization of the Cobalt (III) Complexes with Tetraaza Macrocyclic Ligands Having Strategically Appended Functional Groups", Inorg. Chem. 1993, 32, 4920-4924.

(Continued)

*Primary Examiner* — James E McDonough
(74) *Attorney, Agent, or Firm* — Muncy, Geissler, Olds & Lowe, P.C.

(57) ABSTRACT

The present invention relates to the field of environmentally oxidative drying inks for wet offset printing processes using environmentally friendly fountain solutions or environmentally friendly fountain concentrates. In particular, the invention related to a kit comprising an environmentally friendly fountain solution or environmentally friendly fountain concentrate and an environmentally friendly oxidative drying ink for wet offset printing processes, wherein said oxidative drying ink comprises at least one oxidative drying varnish and one or more neutral manganese complex compounds and wherein said fountain solution or fountain solution concentrate comprises one or more manganese (II) salts of a $C_1$-$C_3$ carboxylic acid.

18 Claims, No Drawings

(56) References Cited

FOREIGN PATENT DOCUMENTS

| JP | 63-218766 | 9/1988 | | |
|---|---|---|---|---|
| JP | 02-080470 | 3/1990 | | |
| JP | 2001341458 | 12/2001 | | |
| WO | 1998051512 | 11/1998 | | |
| WO | 2002100960 | 12/2002 | | |
| WO | 2008003652 | 1/2008 | | |
| WO | 2009007988 | 1/2009 | | |
| WO | 2011083309 | 7/2011 | | |
| WO | 2011098583 | 8/2011 | | |
| WO | 2011098584 | 8/2011 | | |
| WO | 2011098587 | 8/2011 | | |
| WO | WO-2012079624 A1 | * 6/2012 | ........... | C09D 167/08 |
| WO | 2014086556 | 6/2014 | | |
| WO | 2014095670 | 6/2014 | | |

OTHER PUBLICATIONS

Soucek and Wu, "Review of autoxidation and driers" Progress in Organic Coatings (2012) 73, 435-454.

Richman et al., "Nitrogen Analogs of Crown Ethers", J. Am.Chem. Soc. 1974, 96, 2268-2270.

Taschenbuch der Kunststoff-Additive (R. Gächter and H. Müller, Carl Hanser Verlag München Wien, Aug. 2, 1983, ISBN 3-446-13689-4), 25 pages.

McAuley et al., "Preparation, Characterization, and Outer-Sphere Electron-Transfer Reactions of Nickel Complexes of 1, 4, 7-Triazacyclononane", Inorg. Chem. 1984, 23-1938-1943.

International Search Report and Written Opinion issued with respect to application No. PCT/EP2016/065519, 8 pages.

\* cited by examiner

ENVIRONMENTALLY FRIENDLY INK AND FOUNTAIN SOLUTION FOR WET OFFSET PRINTING PROCESS AND WET OFFSET PRINTING PROCESS

The present invention relates to the field of environmentally oxidative drying inks for wet offset printing processes using environmentally friendly fountain solutions or environmentally friendly fountain concentrates. In particular, the invention related to a kit comprising an environmentally friendly fountain solution and an environmentally friendly oxidative drying ink for wet offset printing processes.

BACKGROUND OF THE INVENTION

Offset printing processes consist of indirect methods wherein an ink is transferred from a printing plate to a blanket cylinder and then said ink is transferred onto a substrate. Accordingly, the blanket cylinder is inked by the printing plate. Offset printing takes advantage of the difference in surface energy between the image area and the non-image area of the printing plate. The image area is oleophilic, whereas the non-image area is hydrophilic. Thus, oily inks used in the method tend to adhere to the image-area and to be repelled from the non-image area of the printing plate. Wet offset printing is typically carried out by feeding both a fountain solution (also referred in the art as dampening solution) and an oleophilic ink to the printing plate surface to allow the image areas to receive preferentially the ink and the non-image areas preferentially the fountain solution and then transferring the ink deposited on image areas onto a substrate.

In a conventional wet offset printing process, the printing plate is damped with a fountain solution thus increasing the difference in surface energy between the image and the non-image area of the printing plate, thereby enhancing the ink repellency of the non-image area and the ink receptivity of the image. In such a process, water forms a film on the hydrophilic areas (i.e. the non-image areas) of the printing plate but contracts into tiny droplets on the water-repellent areas (i.e. the image areas). When an inked roller is passed over the damped printing plate, it is unable to ink the areas covered by the water film but it pushes aside the droplets on the water-repellant areas and these ink up. In other words, fountain solutions are used to separate the image and non-image areas so as to prevent the transfer of ink onto non-image areas of the printing plate. Moreover, the fountain solution has to fulfill various tasks including the wetting of the non-image area quickly, uniformly and without excess; quickly producing a homogeneous emulsion with the oily ink; protecting the printing plate against corrosion and wear and maintaining a low and constant temperature in the ink train.

Oxidative drying inks (i.e. inks which dry by oxidation in the presence of oxygen, in particular in the presence of the oxygen of the atmosphere) are typically used during offset printing processes. Oxidative drying inks preferably comprise catalysts or driers (also referred in the art as siccatives, siccative agents, desiccatives or dessicators) to set up the oxidation process. Examples of driers include inorganic or organic salts of metal(s), metallic soaps of organic acids, metal complexes and metal complex salts. Known driers comprise metals such e.g. cobalt, copper, manganese, cerium, zirconium, barium, strontium, lithium, bismuth, calcium, vanadium, zinc, iron and mixtures thereof. In particular, cobalt salts are widely used as driers for inks and coatings due to their high oxidative drying efficiency and their robustness, i.e. their efficiency remains independent of the coating compositions.

Failure of the ink to dry rapidly results in set off. Set off occurs when printing ink which is not dry adheres to the back of a printed substrate placed on top of it during the stacking of printed substrates as it comes off the presses (see e.g. U.S. Pat. No. 4,604,952). This is a particular problem in the use of off-set printing processing for printing security features. Bank notes and other security documents typically carry a multitude of overlapping security features which are applied one after the other. If the previously applied security feature, e.g. a background image or graphic pattern, has not yet sufficiently dried, the whole multi-step printing process is delayed.

Catalysts comprising other metals, such as e.g. manganese, cerium, zirconium, bismuth, calcium, zinc and iron, have been used as catalysts for the drying process of oxidative drying inks. However, their oxidative drying efficiency tends to be weaker as compared to cobalt catalysts. Moreover, these catalysts' robustness is more restricted as compared to the conventional cobalt catalysts.

There is some increasing concern about cobalt containing driers for reasons of health and environment issues. With the implementation of REACh, (eco)-toxicological studies are being conducted in Europe. In this frame, cobalt compounds have been increasingly scrutinied in particular with regards to their potential effects on the environment and on the reproduction. For instance, the environmental toxicity of the widely used drier cobalt ethylhexanoate has been raised in 2010 from being classified as "Toxic to the environment" (Hazard statements H401: toxic to aquatic life/H413: may cause long-lasting harmful effects to aquatic life) to "Very toxic to the environment" (Hazard statements H400: very toxic to aquatic life). As a consequence, products containing as low as 0.25% of cobalt ethylhexanoate must already be reclassified themselves as "Toxic to the environment" (information note on cobalt ethylhexanoate, CEPE, December 2010). Furthermore, it is as well classified as H361f (suspected of damaging fertility), which would trigger the classification of any mixture containing it at more than 0.3% as reprotoxic.

In an attempt to provide driers that are more friendly to health and environment, a variety of compounds have been developed. Catalysts comprising other metals, such as e.g. manganese, cerium, zirconium, bismuth, calcium, zinc and iron, have been used as catalysts for the drying process of oxidative drying inks. However, their oxidative drying efficiency tends to be weaker as compared to cobalt catalysts. Moreover, the robustness of these catalysts is more restricted as compared to the conventional cobalt catalysts.

Manganese containing compounds have been developed as driers for coatings or inks. E. Bouwman and R. van Gorkum disclose complexes of manganese, pentadione and bipyridyl as driers for alkyd paints, in particular for the oxidative crosslinking of ethyl linoleate (J. Coat Technol Res 4(4) (2007, 491-503). WO 2008/003652 A1 and WO 2011/083309 A1 disclose catalysts based on iron-manganese complexes containing polydentate ligands for air-drying alkyd-based resins. EP 1 564 271 B1 discloses driers consisting of a combination of iron and manganese salts of fatty acids. WO 2011/098583 A1, WO 2011/098584 A1 and WO 2011/098587 A1 disclose oxidative drying coating compositions comprising polymers containing unsaturated fatty acid residues and manganese salts complexes as drying catalysts.

Recent developments in the field of driers for oxidizing alkyds useful as polymeric binders have been reviewed by Soucek and Wu in Progress in Organic Coatings (2012) 73, 435-454. However, none of these driers is as reactive and universal as the cobalt containing driers known in the art. Alternative driers also frequently tend to produce undesired yellowing of the dried coating. Moreover, alternative driers often cause storage stability problem related to skin formation inside the ink container and require the addition of increased concentrations of anti-skinning agents.

WO 2014/086556 A1 discloses oxidative drying inks suitable for offset, letterpress and intaglio printing, wherein said oxidative drying inks comprise at least one oxidative drying varnish and one or more neutral manganese complex compounds. The disclosed inks are said to combine short drying times while exhibiting good non-yellowing characteristics upon use and time and while being environmentally friendly.

With the same aim of accelerating the drying process, it has been the practice to add driers, in particular cobalt-containing driers, to the fountain solution. Even though the ink and the fountain solution are immiscible, a certain amount of fountain solution is invariably transferred from the plate to the inking rollers. The driers are carried thereby into the inking system and become emulsified in the ink (see e.g. U.S. Pat. No. 3,354,824).

As mentioned hereabove, wet offset printing processes use fountain solutions. In the light of concerns about cobalt-containing compounds for reasons of health and environment (for example, cobalt acetate is classified as SVHC) and since high amounts of fountain solutions are used and consequently high amounts of waste are produced, there is a strong need for environmentally friendly fountain solutions.

JP 2001341458 A discloses fountain solutions for lithographic printing processes, said fountain solutions comprising a fatty acid metal salt as drier to accelerate the drying process of oxidative drying inks on paper. Since the disclosed fatty acid metal salts are not water soluble, they are absorbed on porous grains, in particular hydrophobic silica particles having an average size between 0.1 μm and 10 μm, which are dispersed in water. Accordingly, such hydrophobic particles are prone to precipitation thus leading to fountain solutions suffering from a lack of stability upon storage and use on the offset printing machine. The description mentions that for example cobalt, manganese, lead, iron, calcium, cerium or rare earth metals can be used as metal component of the fatty acid metal salt. The sole examples disclosed in JP 2001341458 A are cobalt-containing fatty acid salts.

US 2004/211333 discloses that inorganic salts of peracids may be used in inks and fountain solutions. In particular, coatings made of these inks are said to be fast drying, having a reduced or no VOC components, and have reduced or no toxic metal-containing components.

Thus, there remains a need for environmentally friendly inks and fountain solutions for wet offset printing processes, wherein both inks and fountain solutions combine stability upon storage at room temperature and stability at low temperature upon use on the printing machine without impacting the drying performance of the applied ink to produce security features on a substrate.

SUMMARY

Accordingly, it is an object of the present invention to overcome the deficiencies of the prior art as discussed above. This is achieved by the provision of simultaneously using during a wet offset printing process, in particular an indirect wet offset printing process, i.e. a wet offset printing process in which the printing plate is indirectly wetted:
a) one or more neutral manganese complex compounds as oxidative catalysts or driers in an oxidative drying ink, said one or neutral manganese complex more compounds having the formula (I)

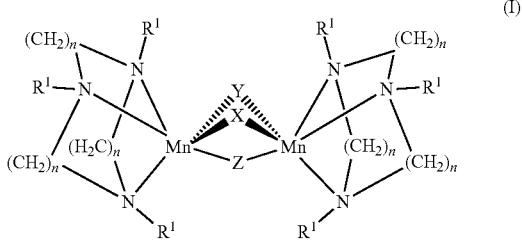

wherein
$R^1$ are identical or different from each other and selected from the group consisting of $C_1$-$C_{18}$-alkyls, $C_1$-$C_{18}$-alkenyls, $C_1$-$C_{18}$-alkynyls and $C_3$-$C_{12}$-cycloalkyls;
n is an integer in a range between 1 and 5;
X, Y and Z are identical or different from each other and selected from $R^2COO^-$;
$R^2$ are identical or different from each other and selected from the group consisting of H, $C_1$-$C_{18}$-alkyls, $C_1$-$C_{18}$-alkenyls, $C_1$-$C_{18}$-alkynyls, $C_3$-$C_{12}$-cycloalkyls, $C_3$-$C_{12}$-cycloalkenyls, $C_1$-$C_{12}$-heterocycloalkyls and $C_7$-$C_{12}$-aralkyls,
preferably one or more neutral manganese complex compounds of the oxidative drying ink are compounds or mixtures of compounds of structure (II)

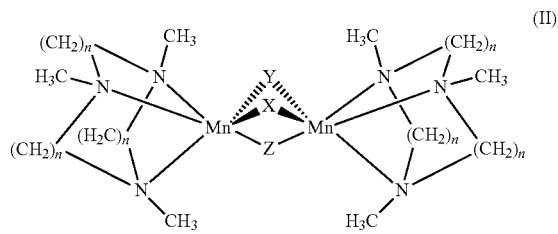

wherein
X, Y and Z are identical or different from each other and selected from the group consisting of $CH_3$—$COO^-$ or $CH_3$—$(CH_2)_3$—$CH(CH_3CH_2)COO^-$, and
n is an integer in a range between 1 and 4; and
b) one or more water-soluble, health- and environment-friendly manganese (II) salts of a $C_1$-$C_3$ carboxylic acid, preferably manganese (II) salts of a $C_1$-$C_3$ monocarboxylic acid, more preferably manganese (II) salts of a $C_1$- or a $C_2$ monocarboxylic acid (i.e. manganese (II) formate and manganese (II) acetate) as additives in a fountain solution.

Described and claimed herein are kits comprising the oxidative drying inks described herein and the fountain solutions described herein for printing a security feature by a wet offset printing process, in particular an indirect wet offset printing process.

The term "kit" is intended to mean that the oxidative drying ink and the fountain solution described herein are provided separately, typically in separate containers, and then preferably packaged together. In this manner, they can be conveniently used in the claimed wet offset printing process for printing a security feature on a substrate.

Also described and claimed herein are processes for printing a security feature on a substrate by a wet offset printing process, in particular an indirect wet offset printing process, and security features obtained thereof as well as substrates comprising said security features, said process comprising the steps of:
a) wetting a printing plate with the fountain solution described herein;
b) inking the printing plate with the oxidative drying ink described herein; and
c) transferring the oxidative drying ink from the printing plate in an offset printing machine to a substrate, via the offset ("blanket") cylinder as explained before, so as to form a security feature on the substrate.

Also described and claimed therein are uses of a) the one or more neutral manganese complex compounds described herein as oxidative catalysts or driers in the oxidative drying ink described herein, and b) the one or more water-soluble, health- and environment-friendly manganese (II) salts of a $C_1$-$C_3$ carboxylic acid, preferably manganese (II) salts of a $C_1$-$C_3$ monocarboxylic acid, more preferably manganese (II) salts of a $C_1$- or a $C_2$ monocarboxylic acid (i.e. manganese (II) formate and manganese (II) acetate) as additives in the fountain solution described herein, for wet offset printing, preferably indirect wet offset printing, of a security feature on a substrate.

Also described and claimed therein are uses of the oxidative drying ink described herein and the fountain solution described herein for a wet offset printing process, preferably for an indirect wet offset printing process.

The fountain solutions described and claimed herein comprise the one or more manganese (II) salts of a $C_1$-$C_3$ carboxylic acid, preferably manganese (II) salts of a $C_1$-$C_3$ monocarboxylic acid, more preferably manganese (II) salts of a $C_1$-$C_2$ carboxylic acid (i.e. manganese (II) formate and manganese (II) acetate) described herein, said manganese (II) salts being not classified as harmful compounds. The fountain solutions described herein are particularly suitable for a wet offset printing process in combination with the oxidative drying inks described herein, the fountain solution comprising one or more water-soluble, health- and environment-friendly manganese (II) salts of a $C_1$-$C_3$ carboxylic acid, preferably manganese (II) salts of a $C_1$-$C_3$ monocarboxylic acid, more preferably manganese (II) salts of a $C_1$- or a $C_2$ monocarboxylic acid (i.e. manganese (II) formate and manganese (II) acetate) and at least one component selected from
(a) acids,
(b) other pH adjusting compounds, wherein an acid and another pH adjusting compound optionally form together a buffer,
(c) water-soluble organic solvents,
(d) surfactants,
(e) polymeric desensitizers, and
(f) chelating agents.

The presence of the one or more manganese (II) salts of a $C_1$-$C_3$ carboxylic acid, preferably manganese (II) salts of a $C_1$-$C_3$ monocarboxylic acid, more preferably manganese (II) salts of a $C_1$-$C_2$ monocarboxylic acid (i.e. manganese (II) formate and manganese (II) acetate) described herein in the fountain solutions described herein strongly decreases the drying time of oxidative drying inks applied by a wet offset printing process in comparison with fountain solutions lacking water-soluble or water-dispersible driers. Another advantage of the fountain solution, according to the present invention, in comparison with fountain solutions containing driers such as those disclosed in JP 2001341458 A, is that its industrial preparation is easy and straightforward due to the high solubility of the one or more manganese (II) salts of a $C_1$-$C_3$ carboxylic acid.

The present invention also relates to a kit comprising the oxidative drying inks described herein and fountain solution concentrates as described below which can be diluted with water to prepare the fountain solution described herein.

The kit described herein advantageously comprise the one or more neutral manganese complex compounds described herein and the fountain solutions described herein or the fountain solution concentrates described herein thus resulting in wet offset printing processes for producing security features with a strong decrease of drying time while being an environmentally friendly process compared to other combinations comprising driers that are commonly used in the field.

DETAILED DESCRIPTION

The following definitions are to be used to interpret the meaning of the terms discussed in the description and recited in the claims.

As used herein, the article "a" indicates one as well as more than one and does not necessarily limit its referent noun to the singular.

As used herein, the terms "about" means that the amount or value in question may be the value designated or some other value about the same. The phrases are intended to convey that similar values within a range of ±5% of the indicated value promote equivalent results or effects according to the invention.

The terms "composition" refers to any composition which is capable of forming a coating on a solid substrate and which can be applied preferentially but not exclusively by a printing method. As used herein, the term "intaglio ink composition" refers to an ink composition which is applied by an intaglio printing process, also designated as engraved copper plate steel die printing process.

As used herein, the term "and/or" or "or/and" means that either all or only one of the elements of said group may be present. For example, "A and/or B" shall mean "only A, or only B, or both A and B".

The term "comprising" as used herein is intended to be non-exclusive and open-ended. Thus, for instance a fountain solution comprising a compound A may include other compounds besides A. However, the term "comprising" also covers, as a particular embodiment thereof, the more restrictive meanings of "consisting essentially of" and "consisting of", so that for instance "a fountain solution comprising A, B and optionally C" may also (essentially) consist of A and B, or (essentially) consist of A, B and C.

Where the present description refers to "preferred" embodiments/features, combinations of these "preferred" embodiments/features shall also be deemed as disclosed as long as this combination of "preferred" embodiments/features is technically meaningful.

As used herein, the term "at least" is meant to define one or more than one, for example one or two or three.

The term "security document" refers to a document which is usually protected against counterfeit or fraud by at least one security feature. Examples of security documents include without limitation value documents and value commercial goods.

The term "security feature" is used to denote an image, pattern or graphic element that can be used for authentication purposes.

The present invention provides a kit and a process for printing a security feature by a wet offset printing process. Wet offset printing is carried out by feeding both a fountain solution (also referred in the art as "dampening solution") and an oxidative drying ink to the printing plate surface to allow the image areas to receive preferentially the ink and the non-image areas preferentially the fountain solution and then transferring the ink deposited on image areas onto a substrate.

Offset printing processes use oxidative drying inks (i.e. inks which dry by oxidation in the presence of oxygen, in particular in the presence of the oxygen of the atmosphere). During the drying process, the oxygen combines with one or more components of the ink vehicle, converting the ink to a semi-solid or a solid state. The drying process may be accelerated by the use of one or more catalysts or driers such as metallic salts and/or by the application of a thermal treatment. During conventional printing of oxidative drying inks, the drying process proceeds during a few hours to a few days.

In a conventional wet offset printing process, the printing plate is dampened with a fountain solution thus increasing the difference in surface energy between the image and the non-image area of the printing plate, thereby enhancing the ink repellency of the non-image area and the ink receptivity of the image. In such a process, water forms a film on the hydrophilic areas (i.e. the non-image areas) of the printing plate but contracts into tiny droplets on the water-repellent areas (i.e. the image areas). When an inked roller is passed over the damped printing plate, it is unable to ink the areas covered by the water film but it pushes aside the droplets on the water-repellant areas and these ink up. In other words, fountain solutions are used to separate the image and non-image areas so as to prevent the transfer of ink onto non-image areas of the printing plate.

Fundamentally, there exist two processes to bring the fountain solution to the printing plate. In the so-called "direct" process, the fountain solution is transported by a series of rollers that are in charge of providing a uniform, precisely metered film to the dampening roller, which is in direct contact with the printing plate. There, a film of fountain solution is created at the surface of the non-image area and contracts in tiny droplets at the surface of the image area. Separately, the ink is transported by a series of rollers to an inking roller that is in direct contact with the previously dampened printing plate. The film of fountain solution on the image area is thus emulsified into the ink, whereas the ink is repelled by the non-image area. Then, the ink emulsion is transferred through the blanket cylinder to the article or the printing substrate to generate an image. In the "indirect" process (also referred in the art as Dahlgren process), the fountain solution is brought by one or more ("a series") of rollers to the inking roller. Thus, the emulsion of fountain solution in the ink is created before contacting the printing plate, and its quality is therefore improved. The emulsion is then transferred to the printing plate. The remaining steps are identical to the direct process. In the Dahlgren system, the printing plate is contacted only by inked rollers, that is, the fountain solution must be carried from dampening unit rollers by means of one or more inked rollers, usually one of the form rollers, to the printing plate. This type of system requires the assistance of a water transport additive such as a water-soluble glycol as disclosed in U.S. Pat. No. 3,625,715 or a volatile alcohol such as disclosed in U.S. Pat. No. 3,168,037. The present invention makes preferably use of the "indirect" wetting (dampening) process, i.e. the printing plate is indirectly wetted.

The present invention provides a kit for wet offset printing a security feature on a substrate, said kit comprising a) an oxidative drying ink comprising at least one oxidative drying varnish and the one or more neutral manganese complex compounds described herein and b) a fountain solution comprising one or more manganese (II) salts of a $C_1$-$C_3$ carboxylic acid.

The oxidative drying inks described herein comprise one or more neutral manganese complex compounds. The term "neutral manganese complex compound" refers to a compound comprising one or more manganese cations, one or more mono- or poly-dentate ligands and one or more anionic ligands. The cations and the ligands are selected such that the overall electronic charge of the complex is zero.

The one or more neutral manganese complex compounds suitable as oxypolymerization catalysts in oxidative drying inks described herein are compounds of general structure (I) or mixtures of different compounds of general structure (I):

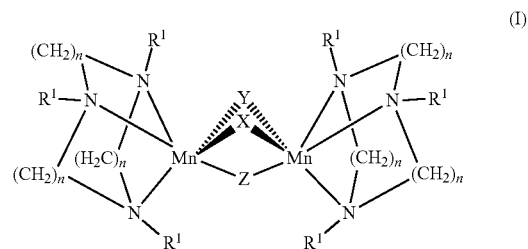

(I)

wherein $R^1$ are identical or different from each other and selected from the group consisting of $C_1$-$C_{18}$-alkyls, $C_1$-$C_{18}$-alkenyls, $C_1$-$C_{18}$-alkynyls and $C_3$-$C_{12}$-cycloalkyls;

n is an integer in a range between 1 and 5, preferably between 2 and 5;

X, Y and Z are identical or different from each other and selected from $R^2COO^-$;

$R^2$ are identical or different from each other and selected from the group consisting of H, $C_1$-$C_{18}$-alkyls, $C_1$-$C_{18}$-alkenyls, $C_1$-$C_{18}$-alkynyls, $C_3$-$C_{12}$-cycloalkyls, $C_3$-$C_{12}$-cycloalkenyls, $C_1$-$C_{12}$-heterocycloalkyls and $C_7$-$C_{12}$-aralkyls, More preferably, the one or more one or more neutral manganese compounds suitable as oxypolymerization catalysts or driers in the oxidative drying inks described herein are compounds of structure (I) or mixtures of different compounds of structure (I), wherein $R^1$ are identical or different from each other and selected from the group consisting of $C_1$-$C_{18}$-alkyls;

n is an integer in a range between 1 and 5, preferably between 2 and 5;

X, Y and Z are identical or different from each other and selected from $R^2COO^-$;

$R^2$ is selected from the group consisting of $C_1$-$C_{18}$-alkyls.

Still more preferably, the one or more one or more neutral manganese compounds suitable as oxypolymerization catalysts or driers in the oxidative drying inks described herein are compounds or mixtures of compounds of structure (II)

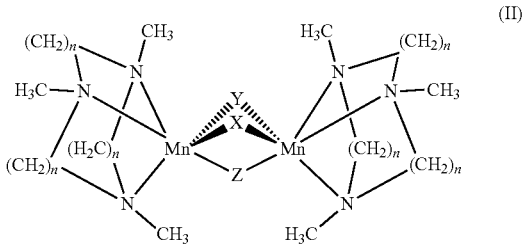

wherein
X, Y and Z are identical or different from each other and selected from the group consisting of $CH_3$—$COO^-$ or $CH_3$—$(CH_2)_3$—$CH(CH_3CH_2)COO^-$, and n is an integer in a range between 1 and 4, preferably between 2 and 4, and more preferably between 2 and 3.

Compounds of structure (II) suitable as oxypolymerization catalysts in the oxidative drying inks described herein are commercially available as Nuodex DryCoat from Rockwood Pigments, UK (CAS Number [1381939-25-8]], Reach Registration Number 01-2119919049-35-0000).

The manganese complexes suitable for the oxypolymerization catalysts in the oxidative drying inks described herein can be prepared by adding together the poly-dentate ligand with a corresponding Mn carboxylate. The preparation of those complexes is known in the art (e.g. Romakh et al., Inorg. Chem 2007, 1315-1331, in particular citations 1-5).

The polydentate ligand can be prepared by methods known in the art (e.g. Richman et al., J. Am. Chem. Soc. 1974, 96, 2268-2270; McAuley et al., Inorg. Chem. 1984, 23-1938-1943; Zhang et al., Inorg. Chem. 1993, 32, 4920, 4924; Romakh et al., Inorg. Chem 2007, 1315-1331). Generally, a suitable aliphatic triamine is fully tosylated and reacted with a base (such as $NaOC_2H_5$) to yield the disodium salt of the tosylate triamine. The disodium salt is subsequently reacted with a respective alkylene ditosylate, resulting in the desired cyclic triamine after detosylation. Radicals $R^1$ in the above formula (I) can be attached by methods known in the art (e.g. Romakh et al., Inorg. Chem 2007, 1315-1331, e.g. scheme 3 on p. 1317) by standard nucleophilic substitution at the N atoms.

It has been found that layers or coatings made of the oxidatively drying inks comprising the one or more neutral manganese complex compounds of structure (I) or (II) or mixtures of various neutral manganese complex compounds of structure (I) or (II) described herein may be dried after application by wet offset printing process on a substrate with a shorter drying time as compared to the various driers known in the art.

The one or more neutral manganese complex compounds described herein are preferably present in the oxidative drying ink described herein in an amount from about 0.01 to about 10 wt. %, preferably from about 0.1 to about 5 wt. %, the weight percents being based on the total weight of the oxidative drying ink. The one or more neutral manganese complex compounds described herein are preferably present in the oxidative drying ink described herein in an amount such that the metal atom or metal ion concentration in weight % is comprised in a range from about 0.0001 to about 10 wt. %, more preferably from about 0.001 to about 5 wt. %, still more preferably from about 0.01 to about 1 wt. %, the weight percents being based on the total weight of the oxidative drying ink.

In one preferred embodiment, the oxidative drying ink used in the present invention contains the above-described one or more neutral manganese complex compounds as sole oxypolymerization catalyst(s) or drier(s). In other words, in this embodiment, the oxidative drying ink does not contain further metal-containing oxypolymerization catalyst(s) or drier(s) and is in particular cobalt-free.

The oxidatively drying inks described herein comprise at least one oxidative drying varnish. The term "varnish" is also referred in the art as resin, binder or ink vehicle. The at least one oxidative drying varnish is preferably present in the oxidatively drying inks described herein in an amount from about 10 to about 90 wt. %, the weight percents being based on the total weight of the oxidatively drying ink.

Suitable oxidative drying varnishes for the oxidatively drying inks described herein are drying oils, i.e. varnishes that cure under the action of oxygen, for instance oxygen from the air ("air-drying").

Alternatively, and with the aim of accelerating the drying process, the drying process may be performed under hot air, infrared or any combination of hot air and infrared.

Oxidative drying inks preferably comprise at least one oxidative drying varnish. Oxidative drying varnishes are typically polymers comprising unsaturated fatty acid residues, saturated fatty acids residues or mixtures thereof, as generally known in the art. Saturated and unsaturated fatty acid compounds may be obtained from natural and/or artificial sources. Preferably the oxidative drying varnishes described herein comprise unsaturated fatty acid residues to ensure the air drying properties. Suitable fatty acids are ethylenically unsaturated conjugated or non-conjugated $C_2$-$C_{24}$ carboxylic acids, such as myristoleic, palmitoleic, arachidonic, erucic, gadoleic, clupanadonic, oleic, ricinoleic, linoleic, linolenic, licanic, nisinic acid and eleostearic acids or mixtures thereof. Those fatty acids are typically used in the form of mixtures of fatty acids derived from natural or synthetic oils. Particularly preferred oxidative drying varnishes are resins comprising unsaturated acid groups, even more preferred are resins comprising unsaturated carboxylic acid groups. However the resins may also comprise saturated fatty acids residues. Preferably the oxidative drying varnishes described herein comprise acid groups, i.e. the oxidative drying varnishes are selected among acid modified resins. The oxidative drying varnishes described herein may be selected from the group consisting of alkyd resins, vinyl polymers, polyurethane resins, hyperbranched resins, rosin-modified maleic resins, rosin-modified phenol resins, rosin ester, petroleum resin-modified rosin ester, petroleum resin-modified alkyd resin, alkyd resin-modified rosin/phenol resin, alkyd resin-modified rosin ester, acrylic-modified rosin/phenol resin, acrylic-modified rosin ester, urethane-modified rosin/phenol resin, urethane-modified rosin ester, urethane-modified alkyd resin, epoxy-modified rosin/phenol resin, epoxy-modified alkyd resin, terpene resins nitrocellulose resins, polyolefins, polyamides, acrylic resins and combinations or mixtures thereof. Polymers and resins are herein interchangeably used.

Saturated and unsaturated fatty acid compounds may be obtained from natural and/or artificial sources. Natural sources include animal sources and/or plant sources. Animal sources may comprise animal fat, butter fat, fish oil, lard, liver fats, tuna fish oil, sperm whale oil and/or tallow oil and waxes. Plant sources may comprise waxes and/or oils such as vegetable oils and/or non-vegetable oils. Examples of plant oils include without limitation bitter gourd, borage, calendula, canola, castor, china wood, coconut, conifer seed, corn, cottonseed, dehydrated castor, flaxseed, grape seed, *Jacaranda mimosifolia* seed, linseed oil, palm, palm kernel, peanut, pomegranate seed, rapeseed, safflower, snake gourd, soya (bean), sunflower, tall, tung and wheat germ. Artificial sources include synthetic waxes (such as micro crystalline and/or paraffin wax), distilling tail oil and/or chemical or biochemical synthesis methods. Suitable fatty acids also include (Z)-hexadan-9-enoic[palmitoleic]acid ($C_{16}H_{30}O_2$), (Z)-octadecan-9-enoic[oleic]acid ($C_{18}H_{34}O_2$), (9Z,11E,13E)-octadeca-9,11,13-trienoic[□ eleostearic]acid ($C_{18}H_{30}O_2$), licanic acid, (9Z,12Z)octadeca-9,12-dienoic [linoeic]acid ($C_{18}H_{32}O_2$), (5Z,8Z,11Z,14Z)-eicosa-5,8,11,14-tetraenoic[arachidonic]acid ($C_{20}H_{32}O_2$), 12-hydroxy-(9Z)-octadeca-9-enoic[ricinoleic]acid ($C_{18}H_{34}O_3$), (Z)-docosan-13-enoic[erucic]acid ($C_{22}H_{42}O_3$) (Z)-eicosan-9-enoic[gadoleic]acid ($C_{20}H_{35}O_2$), (7Z,10Z,13Z,16Z,19Z) docosa-7,10,13,16,19-pentaenoic[clupanodonic] acid and mixtures thereof.

Suitable fatty acids are ethylenically unsaturated conjugated or non-conjugated $C_2$-$C_{24}$ carboxylic acids, such as myristoleic, palmitoleic, arachidonic, erucic, gadoleic, clupanadonic, oleic, ricinoleic, linoleic, linolenic, licanic, nisinic acid and eleostearic acids or mixtures thereof. Those fatty acids are typically used in the form of mixtures of fatty acids derived from natural or synthetic oils.

The oxidatively drying inks described herein may further comprise one or more co-catalysts. Suitable co-catalysts include without limitation polyvalent salts containing calcium, cerium, copper, zinc, iron, zirconium, manganese, barium, zinc, strontium, lithium, vanadium and potassium as the cation(s); and halides, nitrates, sulphates, carboxylates like acetates, ethylhexanoates, octanoates and naphtenates or acetoacetonates as the anion(s). When present, the one or more co-catalysts are preferably present in an amount from about 0.001 to about 1.0 wt. %, the weight percents being based on the total weight of the oxidatively drying ink. Alternatively, suitable co-catalysts include without limitation basic compounds such as amines. Typical examples of basic compounds include without limitation primary amines (e.g. diethylenetriamine), tertiary amines (e.g. 1,1,4,7,10,10-hexamethyltriethylenetetramine) or mixtures thereof. When present, the one or more basic compounds are preferably present in an amount from about 0.01 to about 1.0 wt. %, the weight percents being based on the total weight of the oxidatively drying ink. Examples of co-catalysts may be found e.g. in WO 2011/098583 A1 or in WO 2009/007988 A1 and the thereto related documents.

The oxidatively drying inks described herein may further comprise one or more antioxidants such as those known by people skilled in the art. Suitable antioxidants include without limitation alkyl phenols, hindered alkyl phenols, alkylthiomethyl-phenols, eugenol, secondary amines, thioether, phosphites, phosphonites, dithiocarbamates, gallates, malonates, propionates, acetates and other esters, carboxamides, hydroquinones, ascorbic acid, triazines, benzyl compounds as well as tocopherols and analogue terpenes. Such antioxidants are commercially available for example from the sources disclosed in WO 02/100 960. Additional general information about antioxidants can be found in Taschenbuch der Kunststoff-Additive (R. Gächter and H. Müller, Carl Hanser Verlag Munchen Wien, 2. Ausg. 1983, ISBN 3-446-13689-4) or Plastics Additives Handbook (H. Zweifel, 5th Ed. 2001, Hanser Publishers Munich, ISB 3-446-21654-5). Hindered alkyl phenols are phenols having at least one or two alkyl groups ortho to the phenolic hydroxyl. One, preferably both, alkyl groups ortho to the phenolic hydroxyl are preferably secondary or tertiary alkyl, most preferred tertiary alkyl, especially tert-butyl, tert-amyl or 1,1,3,3-tetramethylbutyl. Preferred antioxidants are hindered alkyl phenols and especially, 2-tert-butylhydroquinone, 2,5-di-tert-butyl-hydroquinone, 2-tert-butyl-p-cresol and 2,6-di-tert-butyl-p-cresol. When present, the one or more antioxidants are present in an amount from about 0.05 to about 3 wt. %, the weight percents being based on the total weight of the oxidatively drying ink.

The oxidatively drying inks described herein may comprise one or more coloring agents selected from the group consisting of dyes, inorganic pigments, organic pigments and mixtures thereof. Dyes suitable for inks are known in the art and are preferably selected from the group comprising reactive dyes, direct dyes, anionic dyes, cationic dyes, acid dyes, basic dyes, food dyes, metal-complex dyes, solvent dyes and mixtures thereof. Typical examples of suitable dyes include without limitation coumarines, cyanines, oxazines, uranines, phtalocyanines, indolinocyanines, triphenylmethanes, naphtalocyanines, indonanaphtalo-metal dyes, anthraquinones, anthrapyridones, azo dyes, rhodamines, squarilium dyes, croconium dyes. Typical examples of dyes suitable for the present invention include without limitation C.I. Acid Yellow 1, 3, 5, 7, 11, 17, 19, 23, 25, 29, 36, 38, 40, 42, 44, 49, 54, 59, 61, 70, 72, 73, 75, 76, 78, 79, 98, 99, 110, 111, 121, 127, 131, 135, 142, 157, 162, 164, 165, 194, 204, 236, 245; C.I. Direct Yellow 1, 8, 11, 12, 24, 26, 27, 33, 39, 44, 50, 58, 85, 86, 87, 88, 89, 98, 106, 107, 110, 132, 142, 144; C.I. Basic Yellow 13, 28, 65; C.I. Reactive Yellow 1, 2, 3, 4, 6, 7, 11, 12, 13, 14, 15, 16, 17, 18, 22, 23, 24, 25, 26, 27, 37, 42; C.I. Food Yellow 3, 4; C.I. Acid Orange 1, 3, 7, 10, 20, 76, 142, 144; C.I. Basic Orange 1, 2, 59; C.I. Food Orange 2; C.I. Orange B; C.I. Acid Red 1, 4, 6, 8, 9, 13, 14, 18, 26, 27, 32, 35, 37, 42, 51, 52, 57, 73, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 221, 249, 252, 254, 262, 265, 274, 282, 289, 303, 317, 320, 321, 322, 357, 359; C.I. Basic Red 1, 2, 14, 28; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, 231, 253; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, 64, 108, 180; C.I. Food Red 1, 7, 9, 14; C.I. Acid Blue 1, 7, 9, 15, 20, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 193, 199, 203, 204, 205, 229, 234, 236, 249, 254, 285; C.I. Basic Blue 1, 3, 5, 7, 8, 9, 11, 55, 81; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, 46, 77; C.I. Food Blue 1, 2; C.I. Acid Green 1, 3, 5, 16, 26, 104; C.I. Basic Green 1, 4; C.I: Food Green 3; C.I. Acid Violet 9, 17, 90, 102, 121; C.I. Basic Violet 2, 3, 10, 11, 21; C.I. Acid Brown 101, 103, 165, 266, 268, 355, 357, 365, 384; C.I. Basic Brown 1; C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, 191, 194; C.I. Direct Black 17, 19, 22, 32, 39, 51, 56, 62, 71, 74, 77, 94, 105, 106, 107, 108, 112, 113, 117, 118, 132, 133, 146, 154, 168; C.I. Reactive Black 1, 3, 4, 5, 6, 8, 9, 10, 12, 13, 14, 18, 31; C.I. Food Black 2; C.I. Solvent Yellow 19, C.I. Solvent Orange 45, C.I. Solvent Red 8, C.I. Solvent Green 7, C.I. Solvent Blue 7, C.I. Solvent Black 7; C.I. Disperse Yellow 3, C.I. Disperse Red 4, 60, C.I. Disperse Blue 3, and metal azo dyes dislcosed in U.S. Pat. Nos. 5,074,914, 5,997,622, 6,001,161, JP 02-080470, JP 62-190272, JP 63-218766. Suitable dyes for the present invention may be infrared absorbing dyes, luminescent dyes. When present, the one or more dyes used in the oxidative drying ink described herein are preferably present in an amount from about 1 to about 20 wt. %, the weight percents being based on the total weight of the oxidatively drying ink.

Typical examples of organic and inorganic pigments include without limitation C.I. Pigment Yellow 12, C.I. Pigment Yellow 42, C.I. Pigment Yellow 93, 109, C.I. Pigment Yellow 110, C.I. Pigment Yellow 147, C.I. Pigment Yellow 173, C.I. Pigment Orange 34, C.I. Pigment Orange 48, C.I. Pigment Orange 49, C.I. Pigment Orange 61, C.I. Pigment Orange 71 C.I. Pigment Orange 73, C.I. Pigment Red 9, C.I. Pigment Red 22, C.I. Pigment Red 23, C.I. Pigment Red 67, C.I. Pigment Red 122, C.I. Pigment Red 144, C.I. Pigment Red 146, C.I. Pigment Red 170, C.I. Pigment Red 177, C.I. Pigment Red 179, C.I. Pigment Red 185, C.I. Pigment Red 202, C.I. Pigment Red 224, C.I. Pigment Red 242, C.I. Pigment Red 254, C.I. Pigment Red 264, C.I. Pigment Brown 23, C.I. Pigment Blue 15, C.I. Pigment Blue 15:3, C.I. Pigment Blue 60, C.I. Pigment Violet 19, C.I. Pigment Violet 23, C.I. Pigment Violet 32, C.I. Pigment Violet 37, C.I. Pigment Green 7, C.I. Pigment Green 36, C.I. Pigment Black 7, C.I. Pigment Black 11, metal oxides such as titanium dioxide, antimony yellow, lead chromate, lead chromate sulfate, lead molybdate, ultramarine blue, cobalt blue, manganese blue, chrome oxide green, hydrated chrome oxide green, cobalt green and metal sulfides, such as cerium or cadmium sulfide, cadmium sulfoselenides, zinc ferrite, bismuth vanadate, Prussian blue, $Fe_3O_4$, carbon black, mixed metal oxides, azo, azomethine, methine, anthraquinone, phthalocyanine, perinone, perylene, diketopyrrolopyrrole, thioindigo, thiazinindigo, dioxazine, iminoisoindoline, iminoisoindolinone, quinacridone, flavanthrone, indanthrone, anthrapyrimidine and quinophthalone pigments. When present, the inorganic pigments, organic pigments or mixtures thereof described herein are preferably present in an amount from about 0.1 to about 45 wt. %, the weight percents being based on the total weight of the oxidatively drying ink.

The oxidatively drying inks described herein may further comprise one or more fillers or extenders preferably selected from the group consisting of carbon fibers, talcs, mica (muscovite), wollastonites, calcinated clays, china clays, kaolins, carbonates (e.g. calcium carbonate, sodium aluminum carbonate), silicates (e.g. magnesium silicate, aluminum silicate), sulfates (e.g. magnesium sulfate, barium sulphate), titanates (e.g. potassium titanate), alumina hydrates, silica, fumed silica, montmorillonites, graphites, anatases, rutiles, bentonites, vermiculites, zinc whites, zinc sulphides, wood flours, quartz flours, natural fibers, synthetic fibers and combinations thereof. When present, the one or more fillers or extenders are preferably present in an amount from about 0.1 to about 40 wt. %, the weight percents being based on the total weight of the oxidatively drying ink.

The oxidatively drying inks described herein may further comprise one or more waxes preferably selected from the group consisting of synthetic waxes, petroleum waxes and natural waxes. Preferably the one or more waxes are selected from the group consisting of microcrystalline waxes, paraffin waxes, polyethylene waxes, fluorocarbon waxes, poly-tetrafluoroethylene waxes, Fischer-Tropsch waxes, silicone fluids, beeswaxes, candelilla waxes, montan waxes, carnauba waxes and mixtures thereof. When present, the one or more waxes are preferably present in an amount from about 0.1 to about 15 wt. %, the weight percents being based on the total weight of the oxidatively drying ink.

The oxidatively drying inks described herein may further comprise one or more machine readable materials selected from the group consisting of magnetic materials, luminescent materials, electrically conductive materials, infrared-absorbing materials and combinations or mixtures thereof. As used herein, the term "machine readable material" refers to a material which exhibits at least one distinctive property which is detectable by a device or a machine, and which can be comprised in a layer so as to confer a way to authenticate said layer or article comprising said layer by the use of particular equipment for its authentication. Magnetic materials are preferably present in an amount from about 5 to about 70 wt. %, luminescent compounds are preferably present in an amount from about 0.5 to about 60 wt. % and infrared-absorbing compounds are preferably present in an amount from about 0.3 to about 60 wt. %, the weight percents being based on the total weight of the oxidatively drying ink.

As known by those skilled in the art, the oxidatively drying inks described herein may further comprise one or more solvents and/or diluents.

The oxidatively drying inks described herein may further comprise additives that include, but are not limited to, one or more of the following components as well as combinations of these: anti-settling agents, anti-foaming agents, surfactants and other processing aids known in the field of inks. Additives described herein may be present in the oxidatively drying ink compositions disclosed herein in amounts and in forms known in the art, including in the form of so-called nano-materials where at least one of the dimensions of the particles is in the range of 1 to 1000 nm.

Particularly preferred oxidative drying inks for printing by offset printing comprise the following components in the following amounts:

| Ingredients | weight-% |
| --- | --- |
| the at least one oxidative drying varnish described herein | 10 to 90, preferably 25 to 90 |
| the one or more neutral manganese complex compounds described herein | 0.001 to 10, preferably 0.1 to 5 |
| the one or more antioxidants described herein | 0.05 to 3, preferably 0.1 to 1 |
| the inorganic pigments, organic pigments or mixtures thereof described herein | 0 to 45, preferably 0.1 to 40 |
| the one or more waxes described herein | 0.5 to 5, preferably 1 to 4 |
| the one or more fillers and/or extenders described herein | 0 to 30, preferably 1 to 20 | the weight percents being based on the total weight of the oxidative drying inks, the sum of the weight percents being 100%.

Typically, oxidative drying inks suitable for wet offset printing processes have a viscosity in the range of about 3 to about 12 Pa s at 40° C. and 1000 $s^{-1}$; the viscosities being measured on a Haake RotoVisco RV1 with a cone plate 1.

The oxidative drying inks described herein are typically prepared by a method comprising a step of dispersing, mixing and/or milling all the ingredients described herein, the one or more antioxidants described herein, the one or more waxes described herein the one or more coloring agents described herein, as the case may be, the one or more fillers and/or extenders described herein when present and the one or more additives when present in the presence of the at least one oxidative drying varnish described herein, thus forming pasty compositions. The one or more one or more neutral manganese complex compounds described herein may be added to the ink either during the dispersing or mixing step of all other ingredients or may be added at a later stage.

As to the preparation and further features and properties of the oxidative drying ink used in the present invention and the one or more neutral manganese complex compounds contained therein, reference can also be made to WO 2014/086556 A1.

The kit described herein comprises a fountain solution comprising one or more manganese (II) salts of a $C_1$-$C_3$ carboxylic acid for wet offset printing. As mentioned hereabove, the wet offset printing process may be a direct process or may be an indirect process. For both processes, the fountain solution has to fulfill various tasks including the wetting of the non-image area quickly, uniformly and without excess; quickly producing a homogeneous emulsion with the oily ink; protecting the printing plate against corrosion and wear and maintaining a low and constant temperature in the ink train, typically between 5 and 15° C.

The fountain solution of the present invention is an aqueous composition comprising one or more water-soluble, health- and environment-friendly manganese (II) salts of a $C_1$-$C_3$ carboxylic acid, preferably manganese (II) salts of a $C_1$-$C_3$ monocarboxylic acid (i.e. manganese (II) formate, manganese (II) acetate and manganese (II) propionate), more preferably manganese (II) salts of a $C_1$-$C_2$ monocarboxylic acid (i.e. manganese (II) formate and manganese (II) acetate). The mono- or dicarboxylic acid may be substituted, especially substituents that increase the water-solubility such as hydroxyl substituents.

Preferably, said one or more manganese (II) salts of a $C_1$-$C_3$ carboxylic acid, are present in an amount from about 0.01 wt. % to about 5 wt. % so as to avoid precipitation of said salts, preferably from about 0.05 wt. % to about 3 wt. %, and more preferably from about 0.1 wt. % to about 2 wt. %, the weight percents being based on the total weight of the fountain solution.

In one preferred embodiment, the fountain solution used in the present invention contains the one or more manganese (II) salts of a $C_1$-$C_3$ carboxylic acid described herein as sole metal-containing drier. In other words, in this embodiment, the fountain solution does not contain further metal-containing drier(s) and is in particular cobalt-free.

Aside from the one or more manganese (II) salts of a $C_1$-$C_3$ carboxylic acid described herein, preferably manganese (II) salts of a $C_1$-$C_3$ monocarboxylic acid (i.e. manganese (II) formate, manganese (II) acetate and manganese (II) propionate), more preferably manganese (II) salts of a $C_1$- or $C_2$-monocarboxylic acid (i.e. manganese (II) formate or manganese (II) acetate) and water, the fountain solution of the present invention may include one or more of the following components:
(a) acids, such as inorganic or organic acids, e.g.
(b) other pH adjusting compounds (resulting preferably in a buffer system),
(c) water-soluble organic solvents,
(d) surfactants,
(e) polymeric desensitizers,
(f) chelating agents,
(g) one or more further additives commonly used in fountain solutions which can be selected for instance from antifoaming agents, such as silicone-based fluids or emulsions (in particular, polydimethyl siloxanes), corrosion inhibitors, such as organic zinc salts, water-soluble inorganic polyphosphates (which can also act as chelating agent (f)), water-soluble copper salts, water-soluble molybdenum salts, water-soluble boron compounds, such as boric acid and boric acid salts, and any of the further corrosion inhibitors described on pages 4 and 5 of WO 98/51512; antimicrobial or biocidal agents (preservatives) such as fungicides, germicides, antibiotics, antibacterials, antivirals, antifungals agents, and combinations thereof; non-piling or lubricating additives, emulsion control agents (other than component d), viscosity-enhancing components (other than component e); dyes and tackifiers.

In one embodiment the present invention specifically relates to a fountain solution suitable for a wet offset printing process, the fountain solution comprising one or more manganese (II) salts of a $C_1$-$C_3$ carboxylic acid and at least one component selected from
(a) one or more acids,
(b) one or more other pH adjusting compounds, wherein an acid and another pH adjusting compound optionally form together a buffer,
(c) one or more water-soluble organic solvents,
(d) one or more surfactants,
(e) one or more polymeric desensitizers, and
(f) one or more chelating agents.

In one preferred embodiment the fountain solution according to the invention has a pH of 4 to 6, wherein this pH is preferably adjusted by a buffer, preferably a citric acid/citrate buffer, a phosphoric acid/phosphate buffer, a succinic acid/succinate buffer or a mixture thereof.

In one further preferred embodiment, the fountain solution of the invention comprises a polymeric desensitizer, preferably a film-forming polymeric sensitizer, more preferably a gum such as gum Arabic.

In one further preferred embodiment, the fountain solution according to the invention comprises the one or more manganese (II) salts of a $C_1$-$C_3$ carboxylic acid in an amount of 0.001 to 5 wt. %, preferably 0.05 wt. % to 2 wt. %, and comprises further:
(a) one or more acids,
(b) optionally one or more other pH adjusting compounds, wherein an acid and another pH adjusting compound optionally form together a buffer, wherein the total amount of acids and other pH adjusting compounds, if present, is 0.1 to 3 wt. %, preferably 0.2 to 1.5 wt. %,
(c) at least 0.5 wt. %, preferably 3-20 wt. % of one or more water-soluble organic solvents,
(d) 0.0001 to 1 wt. % of one or more surfactants,
(e) 0.01 to 1 wt. % of polymeric one or more desensitizers, and
(f) optionally 0.001 to 0.5 wt. % of one or more chelating agents, and optionally up to 1 wt. % of one or more further additives selected from non-surfactant-based antifoaming agents, corrosion inhibitors, preservatives, non-piling or lubricating additives, emulsion control agents, viscosity-enhancing components, dyes, and tackifiers, the remainder being preferably water, wherein all amounts given in wt. % are based on the total weight of the fountain solution.

The role of the one or more acids described herein is to maintain the hydrophilicity of the printing plate which is typically made of aluminum carrying a thin layer of aluminum oxide $Al_2O_3$. Preferred examples of acids include without limitation phosphoric acid, and mono- or polycarboxylic acids or mono- or polyhydroxycarboxylic acids such as citric acid, lactic acid and succinic acid, as well as blends thereof.

Suitable fountain solutions for the present invention preferably have a pH between about 4.0 and about 6.0, preferably between about 4.5 and about 5.5. To maintain the required pH and avoid pH variation due to different causes e.g. the dilution with water and/or the contact with the alkaline printing paper substrate, the fountain solution can comprise one or more pH adjusting compounds which, if desired, can provide the necessary buffer capacity together the aforementioned acids. A pH lower than about 4.0 may adversely affect the efficiency of other components present in the fountain solution, such as the polymeric desensitizer (e.g. gum Arabic), as well as increasing the drying time of the oxidative drying inks. Furthermore, a pH value lower than about 4 increases the risk of corrosion of metallic elements of the ink train. A pH value higher than about pH 6.0 impairs the efficiency of the acid used to maintain the hydrophilicity of the aluminum printing plate, because the acid used (e.g. phosphoric acid) is no longer able to react with the hydroxyl groups present at the surface of aluminum. The one or more pH adjusting compounds may be selected from the corresponding salt of inorganic acids, organic acids such as those described above, and a mixture thereof, provided that the $pK_a$ of said inorganic acids or organic acids is sufficiently close to the desired pH range. Since one or more acids can already be present in the fountain solution as described herein, the desired buffer capacity may be obtained by adding the amount of the corresponding acid salt, such as for example sodium phosphate, $NaH_2PO_4$, disodium phosphate, $Na_2HPO_4$, sodium citrate, sodium succinate, or a mixture thereof, which is required to adjust the pH to the preferred value of 4.0 to 6.0. In one preferred embodiment the fountain solution of the present invention contains a buffer system containing a mono- or polycarboxylic acid or mono- or polyhydroxycarboxylic acid and the corresponding salt (such as for example a citric acid/citrate buffer and/or a succinic acid/succinate buffer), or a phosphate-based buffer.

The fountain solutions described herein may comprise one or more water-soluble organic solvents which are preferably selected from water-soluble monohydric alcohols (preferably ethanol and/or isopropyl alcohol), water-soluble polyhydric alcohols, e.g. glycols, polyglycols and glycerol, water-soluble ethers, water-soluble glycolethers, water-soluble esters and water-soluble glycolesters. The role of the one or more water-soluble organic solvents described herein is to lower the surface tension of the fountain solution and to quickly and efficiently wet the non-printing area of the printing plate. The polyhydric organic solvents can also serve as humectant as explained below. Typically, isopropyl alcohol is used as water-soluble organic solvent for an indirect (Dahlgren) process. Since the vapor pressure of isopropyl alcohol is rather low (33.1 mm Hg at 25° C.), it evaporates in use, thus contributing to maintaining a low temperature in the ink train, typically between 5 and 15° C., and leaving no residues. Due to the growing health and environmental concern regarding isopropyl alcohol, which is classified as a volatile organic compound (VOC) and an irritating compound, substitutes have been developed and proposed to replace it. Typical example of those substitutes include without limitation less volatile or non-volatile alcohols, such as polyhydric alcohols, e.g. glycols, polyglycols, or glycerol, ethers, glycolethers, esters and glycolesters such as e.g. those described in U.S. Pat. No. 6,436,176. Glycols, glycerol, sorbitol, hexitol or polyglycols also have a humectant effect as described in U.S. Pat. No. 4,798,627. Preferably, the one or more water-soluble organic solvents described herein are present in an amount of at least 0.5 wt. %, more preferably from about 3 to about 20 wt. %, e.g. from about 0.5 to about 5 wt. % (e.g. if no volatile monohydric alcohol is present) or from about 5 to about 15 wt. % (e.g. if a volatile monohydric alcohol such as isopropyl alcohol is present), each based on the total weight of the fountain solution.

The fountain solution of the present invention may comprise one or more water-soluble surfactants. The one or more surfactants have a similar function as the one or more water-soluble organic solvents, i.e. reducing the surface tension of the fountain solution to accelerate the wetting of the non-printing area of the printing plate by said fountain solution and to help forming the ink emulsion. Additionally, the presence of the one or more surfactants allows lowering the amount of isopropyl alcohol or alternative water-soluble organic solvents. The one or more surfactants may be anionic surfactants, non-ionic surfactants or mixtures thereof, such as those described for example in EP 2 098 377 A2. Preferably, the one or more surfactants described herein are present in an amount not exceeding about 1 wt. %, to avoid the formation of foam, preferably from about 0.001 to about 0.5 wt. %, the weight percents being based on the total weight of the fountain solution.

The fountain solutions described herein may comprise one or more polymeric desensitizers which preferably have film forming properties. The role of the one or more desensitizers is to protect the non-printing area of the printing plate, and to maintain its hydrophilicity. The one or more desensitizers can be selected from carbohydrate-based natural products such as gums, in particular gum Arabic. Alternatively, synthetic hydroxylated macromolecular compounds or synthetic derivatives of cellulose or starch may be used as the one or more desensitizers, such as those described e.g. in EP 2 098 377 A2. Preferably, the one or more desensitizers described herein are present in an amount from about 0.01 to about 5 wt. %, more preferably about 0.05 to about 1.5 wt. % based on the total weight of the fountain solution.

The fountain solutions described herein may comprise one or more chelating agents. The role of the one or more chelating agents is to coordinate or complex a potential excess of cations, especially when "hard" tap water is used. For example, calcium and magnesium cations present in such hard water may react with fatty acid groups present in the oxidative drying ink described herein and induce precipitation, or calcium carbonate may precipitate in the printing machine. Suitable chelating agents to coordinate cations are known in the art and include without limitation ethylenediaminetetraacetic acids and potassium salts and sodium salts thereof, diethylenetriaminepentaacetic acids and potassium salts and sodium salts thereof, triethylenetetraminehexaacetic acids and potassium salts and sodium salts thereof, hydroxyethylethylenediaminetriacetic acids and potassium salts and sodium salts thereof, nitrilotriacetic acids and sodium salts thereof, organic phosphonic acids such as 1-hydroxy ethane-1,1-diphosphonic acid and potassium salts and sodium salts thereof, methylenephosphonic acids and potassium salts and sodium salts thereof, and phosphonoalkanetricarboxylic acids such as disclosed in EP 2 098 377 A2. Preferably, the one or more chelating agents described herein are present in an amount from about 0.001 wt. % to about 0.5 wt. %, based on the total weight of the fountain solution.

The fountain solution described herein may be prepared by gently mixing water, the manganese (II) salts of a $C_1$-$C_3$ monocarboxylic acid described herein, and, if present, one or more of components (a) to (g) described before, so as to obtain an homogeneous and clear fountain solution.

Suitable fountain solutions for the present invention preferably have a conductivity not higher than 3000 ρS/cm, preferably the conductivity is higher than 500 and not higher than 3000 pS/cm, so as to avoid printing problems such as for example scumming or stripping.

Alternatively, the kit described herein comprises a fountain solution concentrate comprising the one or more manganese (II) salts of a $C_1$-$C_3$ carboxylic acid described herein, water and further at least one component selected from
(a) one or more acids,
(b) one or more other pH adjusting compounds, wherein an acid and another pH adjusting compound optionally form together a buffer,
(c) one or more water-soluble organic solvents,
(d) one or more surfactants,
(e) one or more polymeric desensitizers, and
(f) one or more chelating agents, and
(g) one or more further additives selected from non-surfactant-based antifoaming agents, corrosion inhibitors, preservatives, non-piling or lubricating additives, emulsion control agents, viscosity-enhancing components, dyes, and tackifiers, wherein the amount of non-aqueous components is at least 25 wt. %, preferably at least 35 wt. %, more preferably at 50 wt. % of the total weight of the concentrate. This concentrate can be diluted with water to obtain the fountain solution described herein.

Accordingly, it is one embodiment of the invention that, in the fountain solution concentrate of the kit described herein, the weight ratios of the components are such that after dilution with water a fountain solution as described and claimed herein can be obtained.

The present invention provides a process for printing a security feature on a substrate by a wet offset printing process and security features on a substrate, preferably security features on a security document, obtained thereof. The process described herein, comprises the steps of:
a) wetting a printing plate with the fountain solution described herein,
b) inking the printing plate with the oxidative drying ink described herein, said printing plate being preferably indirectly wetted, and
c) transferring the oxidative drying ink from the printing plate in an offset printing machine to a substrate so as to print a security feature on the substrate.

Typical examples of substrate include without limitation fiber-based substrates, preferably substrates based on cellulosic fibers such as paper, paper-containing materials, polymer-based substrates, composite materials (e.g. substrates obtained by the lamination of paper layers and polymer films), metals or metalized materials, glasses, ceramics and combinations thereof. Typical examples of polymer-based substrates are substrates made of ethylene- or propylene-based homo- and copolymers such as polypropylene (PP) and polyethylene (PE), polycarbonate (PC), polyvinyl chloride (PVC) and polyethylene terephthalate (PET). Typical examples of composite materials include without limitation multilayer structures (e.g. laminates) of at least one paper layer and at least one polymer film, including polymers such as those described above, as well as paper-like substrates based on mixtures of cellulosic fibers and synthetic polymer fibers. In one preferred embodiment the security features is printed on a substrate selected from offset papers and fiduciary papers. Offset paper is manufactured from wood-pulp cellulose with properties that make the paper suitable for offset printing, including dimensional stability, resistance to curling, high surface strength, a surface free from foreign particles and a high level of resistance to moisture penetration. Typically the basis weight of offset paper is of 30 $g/m^2$ to 250 $g/m^2$, preferably of 50 $g/m^2$ to 150 $g/m^2$.

Fiduciary paper (also referred in the art as security paper) is manufactured from lignin-free, cotton-pulp cellulose. Compared to offset papers, additional properties of fiduciary papers include enhanced mechanical resistance (especially resistance to tearing and wearing), resistance to soiling and treatment against degradation by micro-organisms (bacteria, virus and fungi). The mechanical resistance of fiduciary papers may be enhanced by the introduction into the paper (cotton-based) pulp of synthetic fibers, and the anti-soiling performance may be improved by coating or printing an anti-soil polymeric layer prior to printing or applying the security features of the banknote. Usually, the treatment with biocides is combined with the anti-soil treatment. Typically, the fiduciary paper has a basis weight of 50 to 150 $g/m^2$, preferably of 80 to 120 $g/m^2$.

Furthermore, the use of fiduciary paper instead of offset paper adds an additional element of anti-counterfeiting protection, since fiduciary paper is manufactured on special paper-making machines that are only available to manufacturers of security paper, and since the supply chain is protected such as to prevent the fiduciary paper from being diverted to counterfeiters.

The process described herein is particularly suitable for printing a security feature on a substrate that is suitable as substrate for a security document. According to one preferred embodiment, the security feature is used as background printing on the substrate to be printed. This means that on top of the security feature printed by the process described herein, i.e. the image, pattern or graphic element that serves for authentication purposes, further security features or non-security features are printed or applied in one or more further printing or applying runs and the security feature printed by the process described herein and the further security or non-security features overlap.

The term "security document" refers to a document having a value such as to render it potentially liable to attempts at counterfeiting or illegal reproduction and which is usually protected against counterfeit or fraud by one or more security features. Examples of security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, bank cards, credit cards, transactions cards, access documents, security badges, entrance tickets, transportation tickets or titles, and the like.

The term "value commercial good" refers to packaging material, in particular for pharmaceutical, cosmetics, electronics or food industry that may comprise one or more security features in order to warrant that the content of the packaging is genuine, like for instance genuine drugs. Example of these packaging material include without limitation labels such as authentication brand labels, tax banderoles, tamper evidence labels and seals. The security document described herein may further comprise one or more additional layers or coatings either below or on top of the security feature described herein. Should the adhesion between the substrate and the security feature described herein be insufficient, for example, due to the substrate material, a surface unevenness or a surface inhomogeneity, an additional layer, coating or a primer between the substrate and the security feature might be applied as known for those skilled in the art.

With the aim of further increasing the security level and the resistance against counterfeiting and illegal reproduction of security documents, the substrate may contain watermarks, security threads, fibers, planchettes, luminescent compounds, windows, foils, decals, coatings and combinations thereof.

The substrate described herein, on which the oxidative drying ink described herein is applied, may consist of an intrinsic part of a security document, or alternatively, the oxidative drying ink described herein is applied onto an auxiliary substrate such as for example a security thread, security stripe, a foil, a decal or a label and consequently transferred to a security document in a separate step.

Also described herein are uses the oxidative drying ink described herein and the fountain solution described herein for a wet offset printing process, preferably for a wet offset printing process in which the printing plate is indirectly wetted.

EXAMPLES

The present invention is now described in more details with reference to non-limiting examples. The examples below provide more detail for the preparation and use of the oxidative drying inks and fountain solutions suitable for the kit according to the invention and comparative data.

Preparation of the Offset Oxidative Drying Inks of Table 1.

15 kg of the oxidative drying inks were independently prepared by mixing at room temperature the ingredients listed in Table 1 with the exception of the drier. The resulting paste was ground on a SDY300 three roll mill in 3 passes (a first pass at a pressure of 6 bars, a second and a third pass at a pressure of 12 bars). The driers were added to the paste obtained as described herebefore and the so-obtained compositions were mixed in a SpeedMixer™ (DAC 3000 HP from Hauschild Engineering) at a speed of 2500 rpm for 3 minutes at room temperature. The viscosity of the so-obtained ink compositions was measured on a Haake Roto Visco 1 rotational rheometer (40° C. and 1000 s$^{-1}$). The oxidative drying ink A1 exhibited a viscosity of 6.8 Pa·s and the oxidative drying ink A2 exhibited a viscosity of 4.4 Pa·s.

Preparation of the Fountain Solutions of Table 3.

15 kg of each fountain solution were prepared each by gently mixing at room temperature for about 1 minute the ingredients given in Table 3 in the stated amounts. The salt solutions used therein were prepared as described further below. Wassertop SF 3.0 is a fountain solution concentrate available from DC Druck-chemie GmbH, Germany.

TABLE 1

Oxidative drying inks

| Ingredients | A1 wt. % | A2 wt. % |
|---|---|---|
| Varnish I | 28.9 | 28.9 |
| Alkyd resin (Uralac AD 85, from DSM) | | |
| Varnish II | 39.7 | 39.7 |
| (40 parts phenolic/alkylphenolic resins cooked in 40 parts tung oil and dissolved in 20 mineral oil (PKWF 6/9 af, from Haltermann)) | | |
| Pigments | 23.6 | 23.6 |
| Cl Pigment Red 166 | | |
| Wax (PE wax) (Lawter) | 3.0 | 3.0 |
| Antioxidant | 0.3 | 0.3 |
| (tert-butyl hydroquinone) (Sigma Aldrich) | | |
| Drier D1[a] | 4.5 | — |
| Nuodex DryCoat[a] | | |
| Drier D2[a] | — | 4.5 |
| Co/Mn[b] | | |

[a]see Table 2

TABLE 2

Driers oxidative drying inks

| Drier | Metal | Drier components | Concentration of the drier's components in the drier [wt. %] | Concentration of the metal(s) in the drier [wt. %][b] |
|---|---|---|---|---|
| D1 Nuodex DryCoat | $Mn^{2+} + Mn^+$ | Mixture of structures (II) CAS [1381939-25-82] | <10 | 1 |
| | | Ethyl hexanol CAS [104-76-7] | <5 | |
| | | Dearomatised Kerosene CAS [64742-48-9] | 70-90 | |
| D2 Co/Mn | $Co^{2+}$ $Mn^{2+}$ | Co-octoate CAS [136-52-7] | 20-50 | 4.7 |
| | | Mn-octoate CAS [13434-24-7] | 20-50 | 4.7 |
| | | C12-C18-hydrocarbons CAS [93924-45-9] | 20-50 | |
| | | Fatty acids CAS [61789-52-4] | 1-5 | |

[b]determined experimentally by ICP-MS

TABLE 3

Fountain solution

| Ingredient [wt. %] | B1 | B2 |
|---|---|---|
| Mn(II) acetate solution[c]/wt. % | 0.83 | — |
| Wassertop SF 3.0/wt. % | 3.00 | 3.00 |
| (DC Druckchemie GmbH) | | |
| Isopropanol/wt. % | 12.00 | 12.00 |
| Thommen AG | | |
| Osmotic water/wt. % | 84.17 | 85 |
| Ingredient [g] | | |
| Mn(II) acetate solution/g | 124.5 | — |
| Wassertop SF 3.0/g | 450 | 450 |
| (DC Druckchemie GmbH) | | |
| Isopropanol/g | 1800 | 1800 |
| (Thommen AG) | | |
| Osmotic water/g | 12625.5 | 12252 |
| properties | | |
| mmol metal/100 g fountain solution | 1.2 | — |
| pH[d] | 5.01 | 5.39 |
| pH change after 24 hours | <0.1 | <0.1 |

TABLE 3-continued

| Fountain solution | | |
|---|---|---|
| Ingredient [wt. %] | B1 | B2 |
| Visual appearance change after 24 hours | no change | no change |
| Conductivity$^d$/μS/cm | 1210 | 918 |

$^c$Mn(II) acetate solution (200 g): 71.6 g manganese (II) acetate tetrahydrate (purity 99 wt. %, SIGMA Aldrich AG) were added to 122.1 g deionized water in a 500 mL-glass vessel. The solution was stirred with a magnetic stirrer until complete dissolution of the crystals (15-20 minutes), then 6.3 g 80% acetic acid (Brenntag Schweizerhall AG) were added and the solution was further stirred during 3-4 minutes. The Mn(II) acetate solution comprised 25.3 wt. % Mn(II) acetate. The final content of Mn(II) acetate in the fountain solution was 31.46 g (0.21 wt. %).
$^d$pH and the conductivity were measured few minutes after the start of the printing process using a Mettler Toledo SevenGoDuo pH and conductivity combined device.

Printing Method

A square pattern (size 4.5 cm×5.2 cm) was printed on offset paper (Antalis Normaset puro 100 g/m², 70.1 cm×49.9 cm) as well as on fiduciary paper (70.1 cm×49.9 cm, Louisenthal BNP paper 100 g/m²) using a Heidelberg Speed Master 74-1 printing at 7500 sheets per hour (experimental conditions: T=20° C. and relative humidity of 52%). The printing conditions are described in Table 4. For each example, a total of 2000 sheets were printed. A ream of 1000 blank sheets of the same paper was put over the 2000 printed sheets just after each print job to simulate standard drying conditions. The amount of offset oxidative drying ink was fixed such as to yield an optical density close to 1.5. The printer was equipped with an Alcolor continuous-film dampening system (Dahlgren system). The ratio between ink and fountain solution was established by varying the relative speed (in %) of the dampening and the inking rollers so as to avoid either overemulsion (by adding too much fountain solution) or insufficient emulsion of the ink (by not adding enough fountain solution).

TABLE 4

| Printing conditions | | | | |
|---|---|---|---|---|
| | C0 | C1 | C2 | E1 |
| oxidative drying ink $A_x$ | A2 | A2 | A1 | A1 |
| fountain solution $B_x$ | B2 | B1 | B2 | B1 |
| Printing run | | | | |
| % speed dampening roller | 48 | 46 | 52 | 54 |
| % speed inking roller | 50 | 58 | 52 | 52 |
| average optical density$^e$ of the printed pattern-offset paper | 1.38 | 1.41 | 1.40 | 1.5 |
| average optical density of the printed pattern-fiduciary paper | 1.47 | 1.46 | 1.47 | 1.50 |

$^e$The optical density was measured at two areas of each printed pattern using a densitometer Gretag D19C and an average value was calculated therefrom.

Drying Test

For each example, a drying test was carried out by selecting a sheet of printed substrate at the bottom of the pile after x days (see Table 5 for the number of days), cutting the print pattern, covering it with a blank piece of the same substrate then submitting the so-formed assembly to a counterpressure of 3.4 bars at 80° C. with an ORMAG Intaglio Proof Press. The printed pattern and the blank piece were separated and the blank piece was checked for ink transfer. A scan was taken from both the original printed pattern and the blank piece using a Konica Minolta bizhub C552 color scanner, at a resolution of 600 dpi. Each scan (comprising the original printed pattern and the blank piece) was opened in Photoshop CS 6 and the number of pixels for the original printed pattern and the transferred pattern on the blank piece was determined. The ratio between the number of pixels of the transferred pattern and the number of pixels of the original printed pattern was used to assess the amount of ink transferred from the original printed pattern to the blank piece. This ratio (in %) is indicated in Table 5.

TABLE 5

| Results | | | | | |
|---|---|---|---|---|---|
| | | C0 | C1 | C2 | E1 |
| offset paper | 3 days | 93 | 79 | 98 | 99 |
| | 4 days | 63 | 37 | NA$^f$ | 2 |
| | 5 days | 0 | 0 | 34 | 0 |
| | 6 days | 0 | 0 | 0 | 0 |
| fiduciary paper | 3 days | 94 | 82 | 97 | 76 |
| | 4 days | 62 | 38 | NA$^f$ | 0 |
| | 5 days | 0 | 0 | 29 | 0 |
| | 6 days | 0 | 0 | 0 | 0 |

$^f$due to an incorrect handling of the printed sheets, the results are not available for C2 at 4 days.

As shown in Table 5 for comparative example C0, the oxidative drying ink comprising a cobalt-containing drier (A2) in the absence of one or more manganese (II) salts of a $C_1$-$C_3$ carboxylic acid in the fountain solution (B2) required five days to exhibit a complete drying (0% ink transfer in the drying test). Whereas comparative example C1 shows that the same oxidative drying ink comprising a cobalt-containing drier (A2) in the presence of manganese (II) acetate in the fountain solution (B1) exhibited the same drying performance (five days to complete drying), it however exhibited a reduced transfer after four days. Comparative example C2 shows that the oxidative drying ink comprising a cobalt-free, manganese complex drier (A1) in the absence of one or more manganese (II) salts of a $C_1$-$C_3$ carboxylic acid in the fountain solution (B2) required six days to exhibit a complete drying.

In contrast to the comparative examples (C0-C2), the example according to the present invention (E1) shows that the oxidative drying ink comprising a cobalt-free, manganese complex drier (A1) in the presence of manganese (II) acetate in the fountain solution (B1) exhibited an improved drying performance. By adding manganese (II) acetate to the fountain solution in the same amount as in C1, the drying time was reduced to four days for the present invention (E1). These results showed that the combination of the manganese complex drier in the ink and one or more manganese (II) salts of a $C_1$-$C_3$ carboxylic acid, in particular manganese (II) acetate in the fountain solution, (E1) allowed improving the drying performance while solving the health and environment issues raised by the use of a cobalt-containing drier in inks.

Preparation of Kit

Suitable amounts of oxidative drying ink A1 and fountain solution B1 as described above are filled each in a container and the two containers packaged together as a kit. This kit can be used in an environmentally friendly process for wet offset printing a security feature wherein the drying performance is improved.

The invention claimed is:

1. A kit for wet offset printing a security feature on a substrate, said kit comprising:
 a) an oxidative drying ink comprising at least one oxidative drying varnish and one or more neutral manganese complex compounds having the formula (I)

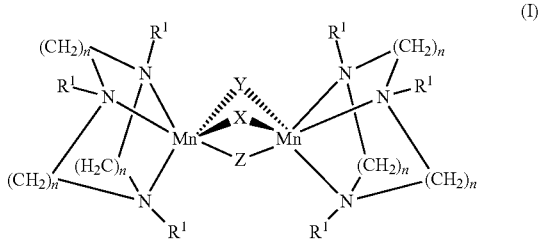

wherein
- $R^1$ are identical or different from each other and selected from the group consisting of $C_1$-$C_{18}$-alkyls, $C_1$-$C_{18}$-alkenyls, $C_1$-$C_{18}$-alkynyls and $C_3$-$C_{12}$-cycloalkyls;
- n is an integer in a range between 1 and 5;
- X, Y and Z are identical or different from each other and selected from $R^2COO^-$;
- $R^2$ are identical or different from each other and selected from the group consisting of H, $C_1$-$C_{18}$-alkyls, $C_1$-$C_{18}$-alkenyls, $C_1$-$C_{18}$-alkynyls, $C_3$-$C_{12}$-cycloalkyls, $C_3$-$C_{12}$-cycloalkenyls, $C_1$-$C_{12}$-heterocycloalkyls and $C_7$-$C_{12}$-aralkyls; and b) a fountain solution comprising one or more manganese (II) salts of a $C_1$-$C_3$ carboxylic acid.

2. The kit according to claim 1, wherein the one or more neutral manganese complex compounds of the oxidative drying ink are compounds or mixtures of compounds of structure (II)

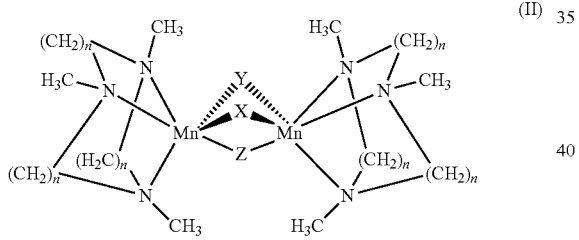

wherein
X, Y and Z are identical or different from each other and selected from the group consisting of $CH_3$—$COO^-$ or $CH_3$—$(CH_2)_3$—$CH(CH_3CH_2)COO^-$, and
n is an integer in a range between 1 and 4.

3. The kit according to claim 1, wherein the fountain solution comprises the one or more manganese (II) salts of a $C_1$-$C_3$ carboxylic acid in an amount from 0.001 to 5 wt. %, preferably from 0.05 to 2 wt. %, all amounts given in wt. % being based on the total weight of the fountain solution.

4. The kit according to claim 1, wherein the one or more manganese (II) salts of the fountain solution are selected from manganese (II) formate and manganese (II) acetate.

5. The kit according to claim 1, wherein the fountain solution further comprises at least one component selected from:
- one or more acids;
- one or more other pH adjusting compounds;
- one or more water-soluble organic solvents;
- one or more surfactants;
- one or more polymeric desensitizers; and
- one or more chelating agents, wherein all amounts given in wt. % being based on the total weight of the fountain solution.

6. The kit according to claim 1, wherein the fountain solution has a pH of 4 to 6.

7. A process for printing a security feature on a substrate by a wet offset printing process comprising the steps of:
a) wetting a printing plate with a fountain solution comprising one or more manganese (II) salts of a $C_1$-$C_3$ carboxylic acid,
b) inking the printing plate with an oxidative drying ink, and
c) transferring the oxidative drying ink from the printing plate in an offset printing machine to a substrate so as to print a security feature on the substrate, wherein the oxidative drying ink comprises at least one oxidative drying varnish and one or more neutral manganese complex compounds having the formula (I)

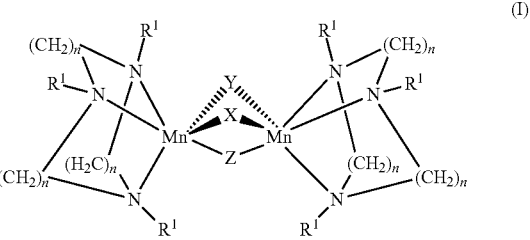

wherein
- $R^1$ are identical or different from each other and selected from the group consisting of $C_1$-$C_{18}$-alkyls, $C_1$-$C_{18}$-alkenyls, $C_1$-$C_{18}$-alkynyls and $C_3$-$C_{12}$-cycloalkyls;
- n is an integer in a range between 1 and 5;
- X, Y and Z are identical or different from each other and are selected from $R^2COO^-$;
- $R^2$ are identical or different from each other and selected from the group consisting of H, $C_1$-$C_{18}$-alkyls, $C_1$-$C_{18}$-alkenyls, $C_1$-$C_{18}$-alkynyls, $C_3$-$C_{12}$-cycloalkyls, $C_3$-$C_{12}$-cycloalkenyls, $C_1$-$C_{12}$-heterocycloalkyls and $C_7$-$C_{12}$-aralkyls; and and wherein the fountain solution comprises one or more manganese (II) salts of a $C_1$-$C_3$ carboxylic acid.

8. The process according to claim 7, wherein in step (b) the printing plate is indirectly wetted.

9. The process according to claim 7, wherein the one or more neutral manganese complex compounds of the oxidative drying ink are compounds or mixtures of compounds of structure (II)

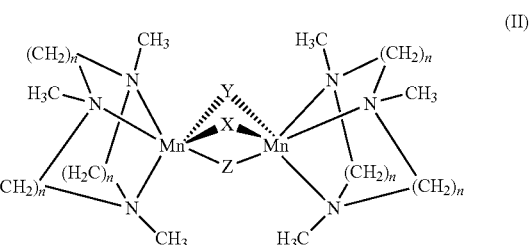

wherein

X, Y and Z are identical or different from each other and selected from the group consisting of $CH_3-COO^-$ or $CH_3-(CH_2)_3-CH(CH_3CH_2)COO^-$, and n is an integer in a range between 1 and 4.

10. The process according to claim 7, wherein the fountain solution comprises the one or more manganese (II) salts of a $C_1$-$C_3$ carboxylic acid in an amount from 0.001 to 5 wt. %, preferably from 0.05 to 2 wt. %, all amounts given in wt. % being based on the total weight of the fountain solution.

11. The process according to claim 7, wherein the one or more manganese (II) salts of the fountain solution are selected from manganese (II) formate and manganese (II) acetate.

12. The process according to claim 7, wherein the fountain solution further comprises at least one component selected from:
   one or more acids;
   one or more other pH adjusting compounds;
   one or more water soluble organic solvents;
   one or more surfactants;
   one or more polymeric desensitizers; and
   one or more chelating agents,
   wherein all amounts given in wt. % being based on the total weight of the fountain solution.

13. The process according to claim 7, wherein the fountain solution has a pH of 4 to 6.

14. The process according to claim 7, wherein the substrate is selected from the group consisting of offset papers, fiduciary papers, polymer-based substrates and composite materials.

15. The kit according to claim 5,
   wherein, if present, an acid and another pH adjusting compound form together a buffer,
   wherein a total amount of acids and other pH adjusting compounds, if present, is from about 0.1 to about 3 wt. %;
   wherein an amount of the one or more water-soluble organic solvents, if present, is from about 3 to about 20 wt. %;
   wherein an amount of the one or more surfactants, if present, is from about 0.0001 to about 1 wt. %;
   wherein an amount of the one or more polymeric desensitizers, if present, is from about 0.01 to about 1 wt. %; and
   wherein an amount of the one or more chelating agents, if present, is from about 0.001 to about 0.5 wt. %,
   wherein all amounts given in wt. % being based on the total weight of the fountain solution.

16. The kit according to claim 6, wherein the pH is adjusted by a citric acid/citrate buffer.

17. The process according to claim 11,
   wherein, if present, an acid and another pH adjusting compound form together a buffer;
   wherein a total amount of acids and other pH adjusting compounds, if present, is from about 0.1 to about 3 wt. %;
   wherein an amount of the one or more water-soluble organic solvents, if present, is from about 3 to about 20 wt. %;
   wherein an amount of the one or more surfactants, if present, is from about 0.0001 to about 1 wt. %;
   wherein an amount of the one or more polymeric desensitizers, if present, is from about 0.01 to about 1 wt. %; and
   wherein an amount of the one or more chelating agents, if present, is from about 0.001 to about 0.5 wt. %,
   wherein all amounts given in wt. % being based on the total weight of the fountain solution.

18. The process according to claim 13, wherein the pH is adjusted by a citric acid/citrate buffer, a phosphoric acid/phosphate buffer, succinic acid/succinate buffer or a mixture thereof.

* * * * *